United States Patent
Greiner-Perth et al.

(10) Patent No.: US 11,390,435 B2
(45) Date of Patent: Jul. 19, 2022

(54) LIQUID DISPENSER

(71) Applicant: APTAR RADOLFZELL GMBH, Radolfzell (DE)

(72) Inventors: Jürgen Greiner-Perth, Gottmadingen (DE); Gerald Krampen, Radolfzell (DE); Timo Jung, Radolfzell (DE); Andi Herz, Eigeltingen-Reute (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 43 days.

(21) Appl. No.: 16/894,154

(22) Filed: Jun. 5, 2020

(65) Prior Publication Data
US 2020/0299038 A1    Sep. 24, 2020

Related U.S. Application Data

(62) Division of application No. 15/592,909, filed on May 11, 2017, now Pat. No. 10,781,020.

(30) Foreign Application Priority Data

Jun. 20, 2016 (DE) .................... 10 2016 210 992.8

(51) Int. Cl.
*B65D 51/16* (2006.01)
*B65D 47/12* (2006.01)
(Continued)

(52) U.S. Cl.
CPC .......... *B65D 51/1616* (2013.01); *A61J 1/145* (2015.05); *A61J 1/1412* (2013.01); *B01D 53/229* (2013.01);
(Continued)

(58) Field of Classification Search
CPC ....... A61J 1/145; A61J 1/1412; B01D 53/229; B01D 61/147; B65D 35/46; B65D 41/32;
(Continued)

(56) References Cited

U.S. PATENT DOCUMENTS

| 4,227,619 A | 10/1980 | Magnusson |
| 5,249,712 A | 10/1993 | Lontrade et al. |
(Continued)

FOREIGN PATENT DOCUMENTS

| CN | 1042121 A | 5/1990 |
| CN | 2277969 Y | 4/1998 |
(Continued)

OTHER PUBLICATIONS

Search Report of German Patent Office issued in Application No. 10 2016 210 992.8 dated Dec. 2, 2016 (5 pages).
(Continued)

*Primary Examiner* — Vishal Pancholi
*Assistant Examiner* — Robert K Nichols, II
(74) *Attorney, Agent, or Firm* — Flynn Thiel, P.C.

(57) ABSTRACT

Liquid dispenser for discharging pharmaceutical liquid having a discharge head and a cap, the cap body of which has a ventilation opening. The dispenser includes an injection-moulded pull-off portion which, in the delivery state, covers the ventilation opening and is connected to the cap body by a substance-to-substance bond. The pull-off portion, together with a tamper-evident portion, which, with the dispenser in the delivery state, prevents removal of the cap body, is part of a common segment which is detachable from the cap body of the cap. Alternatively, the ventilation opening is provided with a filter membrane for filtering the air which flows through it, and the cap body includes two part-bodies which together form a receiving space for the filter membrane.

12 Claims, 4 Drawing Sheets

(51) Int. Cl.
  *A61J 1/14*     (2006.01)
  *B01D 53/22*    (2006.01)
  *B01D 61/14*    (2006.01)
  *B65D 35/46*    (2006.01)
  *B65D 41/32*    (2006.01)
  *B65D 47/20*    (2006.01)

(52) U.S. Cl.
  CPC .......... *B01D 61/147* (2013.01); *B65D 35/46* (2013.01); *B65D 41/32* (2013.01); *B65D 47/12* (2013.01); *B65D 47/2075* (2013.01); *B65D 51/1611* (2013.01); *B65D 2205/02* (2013.01)

(58) Field of Classification Search
  CPC .............. B65D 47/12; B65D 47/2075; B65D 51/1611; B65D 51/1616; B65D 2205/02; B65D 2101/0007; B65D 2101/0023
  USPC ......... 222/153.05–153.7, 206, 213; 215/307, 215/902
  See application file for complete search history.

(56) References Cited

U.S. PATENT DOCUMENTS

| | | | | |
|---|---|---|---|---|
| 5,649,639 | A | * | 7/1997 | Dolvet ............... B65D 51/1616 220/203.11 |
| 8,393,491 | B2 | | 3/2013 | Seelhofer |
| 2015/0166224 | A1 | | 6/2015 | Greiner-Perth et al. |
| 2015/0166229 | A1 | | 6/2015 | Wochele et al. |
| 2016/0031158 | A1 | | 2/2016 | Ogawa et al. |
| 2016/0311589 | A1 | | 10/2016 | Wochele |
| 2018/0127190 | A1 | | 5/2018 | Kang |

FOREIGN PATENT DOCUMENTS

| | | |
|---|---|---|
| CN | 2332663 Y | 8/1999 |
| CN | 101432200 A | 5/2009 |
| CN | 105015943 A | 11/2015 |
| DE | 102013226250 A1 | 6/2015 |
| EP | 3023383 A2 | 5/2016 |

OTHER PUBLICATIONS

Notification of Transmittal of International Search Report issued in Application No. PCT/EP2017/061759 dated Aug. 29, 2017 (1 page).
International Search Report with English translation of categories of documents cited issued in Application No. PCT/EP2017/061759 dated Aug. 29, 2017 (7 pages).
Written Opinion of International Search Report issued in Application No. PCT/EP2017/061759 dated Aug. 29, 2017 (10 pages).
Office Action from the Chinese Patent Office corresponding to Chinese Patent Application No. 201780038496.3, with English translation, dated Sep. 2, 2019 (22 pages).
Office Action issued in corresponding Indian Application No. 201817045320 dated Jun. 1, 2020 (6 pages).
Chinese Office Action issued in corresponding Chinese Patent Application No. 202011509870.3, with partial English translation, dated Feb. 21, 2022 (15 pages).

* cited by examiner

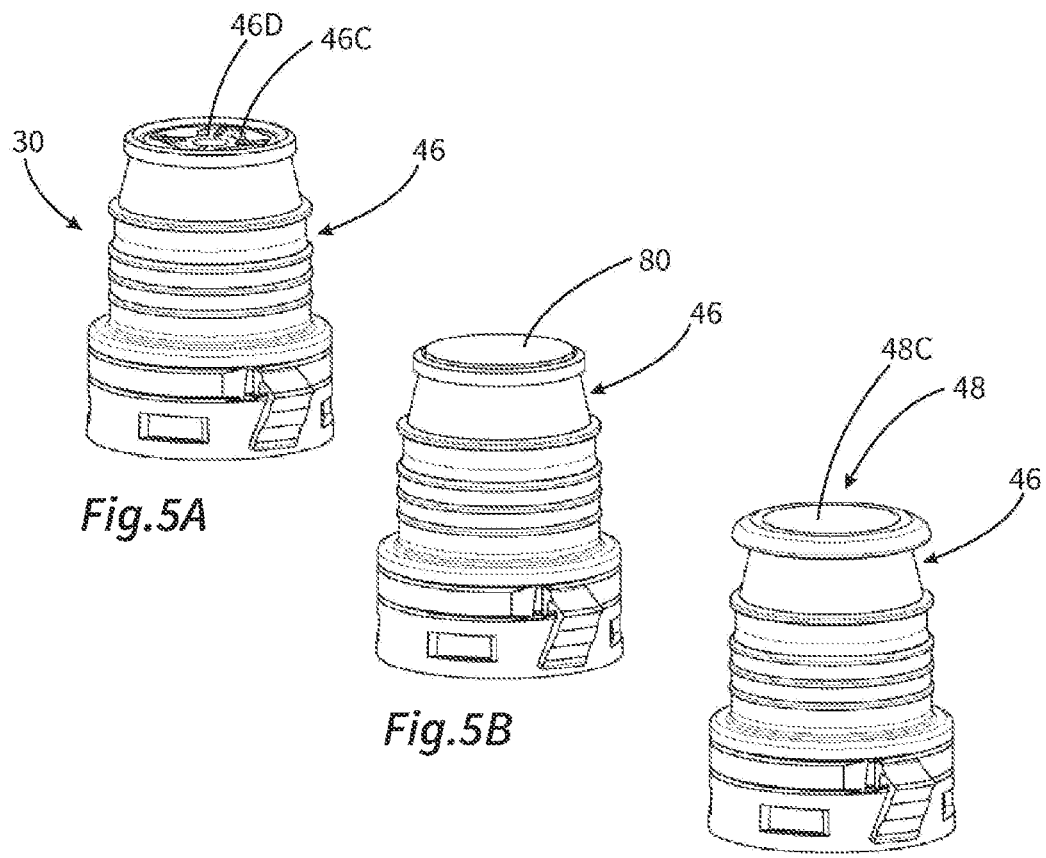
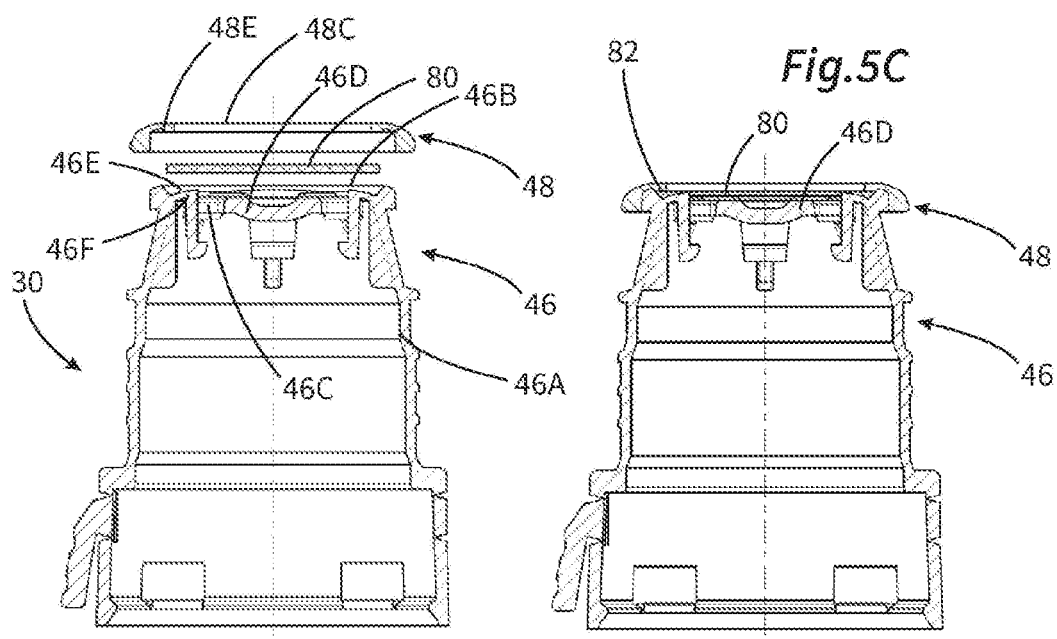

LIQUID DISPENSER

CROSS-REFERENCE TO RELATED APPLICATIONS

This is a divisional of prior U.S. application Ser. No. 15/592,909, filed May 11, 2017, which claims priority from German Application No. 10 2016 210 992.8, filed Jun. 20, 2016, the entire contents of both of which are hereby incorporated herein in their entirety.

SCOPE AND PRIOR ART

The cap bodies of liquid dispensers according to the invention have a ventilation opening so that, after they have been operated for the first time, an air exchange between the interior of the cap body and a surrounding atmosphere is possible.

DE 10 2013 226 250 A1 already discloses closing a ventilation opening in the cap body with an adhesive strip or an injection-moulded pull-off tab, which are removed during the course of the initial operation.

OBJECT AND ACHIEVEMENT

The object of the invention is to create a possibility which is favourable from a production point of view to ensure that no contamination passes to the discharge opening through the ventilation opening prior to the initial operation.

According to a first variant of the invention, a liquid dispenser according to the invention is realized as explained below. The liquid dispenser has a discharge head on which a discharge opening is provided, as well as a cap with a cap body which is fittable on the discharge head and is removable from the same and which, in the fitted state, covers the discharge opening. Said cap body has the named ventilation opening which connects a surrounding atmosphere to an interior of the cap body such that, once the liquid dispenser has been used for the first time and the cap body is fitted, the discharge opening, which is covered by the cap body, is able to dry off as a result of the connection to the surrounding atmosphere.

In addition, the cap has an injection-moulded pull-off portion which, in the delivery state, covers the ventilation opening and is connected to the cap body by way of a substance-to-substance bond, as well as a tamper-evident portion, which, with the dispenser in the delivery state, prevents the cap body from being detached until the tamper-evident portion has been removed from the cap body. According to the invention, the cap has a segment which is detachable as one unit from the cap body and includes said tamper-evident portion and the pull-off portion.

The cap, which is provided in the case of said first variant, accordingly has the named cap body, which is fittable on the discharge head so as to be re-usable in the intended manner and is held thereon in the fitted state in a positive locking or non-positive locking manner, as well as the segment which is detachable from said cap body and includes at least the tamper-evident portion and the pull-off portion. The tamper-evident portion, which is preferably designed in the form of a circumferential tamper-evident band which is injection moulded on the cap body in the delivery state, indicates that the dispenser has not yet been used as the cap cannot be detached until the tamper-evident portion has been detached.

The ventilation opening is a breakthrough in the cap body which, in the case said first variant of the invention, is preferably arranged in the lateral surface of the cap body.

The pull-off portion closes said ventilation opening in the delivery state and is preferably integrally connected to an edge of the ventilation opening in a circumferential manner, the material, preferably a soft plastics material, being particularly thin in the connecting region between the cap body and the pull-off portion in order to facilitate the separation.

Designing the pull-off portion, which covers the ventilation opening in the delivery state, and the tamper-evident portion in a joint manner ensures that when the liquid dispenser is used for the first time in the intended manner, the pull-off portion is separated from the cap body and, in this connection, releases the ventilation opening. The risk of a user separating the detachable segment from the cap body only in the region of the tamper-evident portion, but leaving it untouched in the region of the ventilation opening is slight.

The detachable segment can have a free connecting portion, which is not integrally moulded on the cap body, between the pull-off portion and the tamper-evident portion.

The free connecting portion, which connects the pull-off portion and the tamper-evident portion together, allows the ventilation opening to be arranged at a comparatively large spacing from the tamper-evident portion. In addition, the proper manner in which the dispenser is used for the first time is very easily grasped as a result. The free connecting portion makes it immediately obvious that the pull-off portion and the tamper-evident portion are linked such that the user, even when using a dispenser according to the invention for the first time in the intended manner, notices how the initial operation is to be effected as a result of detaching the tamper-evident portion and the pull-off portion.

The detachable segment can have a grip portion which is attached in such a manner on the detachable segment that an application of force on the grip portion away from the cap body causes the pull-off portion to separate from the cap body first of all and only then the tamper-evident portion to separate from the cap body.

The grip portion is a portion of the segment which is detachable from the cap body, which portion is suitable to be gripped, in particular, by the thumb and forefinger. In particular, the grip portion can be recognizable as the grip portion by its shape and by a surface of preferably at least 8 mm×8 mm. In addition, fluting or the like can also be provided in order to illustrate the method of operation. The detachable segment is gripped in the intended manner by the user at said grip portion and then is used to separate the detachable segment as a result of applying force to the cap body. By the grip portion being arranged closer to the pull-off portion than to the tamper-evident portion, the ventilation opening is opened first of all and only then is the tamper-evident portion detached. As a result, a user is effectively prevented from wrongly separating only the tamper-evident portion, then leaving, however, the segment, which is fully detachable from the cap body, on the cap body in the region of the pull-off portion and consequently not opening the ventilation opening.

The grip portion can be realized as a flatly extended portion. The grip portion is then preferably connected to the pull-off portion by means of a spacer portion which is at least 1 mm long and is aligned orthogonally with respect to the gripper portion.

In the case of said design, it is provided that the flat grip portion forms a shell which is on the outside with respect to the pull-off portion and is connected to said pull-off portion by means of the named spacer portion which is preferably rigid in such a manner that a tilting movement of the grip portion causes an almost identical tilting movement of the pull-off portion. As a result, opening the ventilation opening is simple. As a result of a tilting movement at the grip portion, the connecting region between the cap body and the pull-off portion begins to tear in the desired manner such that complete separation of the pull-off portion is then easily possible.

The pull-off portion is preferably connected by way of a substance-to-substance bond to an inside edge of the ventilation opening in a circumferential manner along a separation line. The separation line comprises a shape which runs to a point on one side.

A pointed shape is to be understood as the separation line between the pull-off portion and the surrounding wall of the cap body forming an acute angle at the point where the separation between the pull-off portion and the cap body is to be effected in the correct manner. At the point, the separation line comprises a very small radius of curvature such that the tearing starts as it were at one point. This facilitates the separation.

According to a second variant of the invention, a liquid dispenser according to the invention is realized as explained below. The liquid dispenser also has a discharge head on which a discharge opening is provided, as well as a cap with a cap body which is fittable on the discharge head and is removable from the same and which, in the fitted state, covers the discharge opening. Said cap body has the named ventilation opening which connects a surrounding atmosphere to an interior of the cap body such that, once the liquid dispenser has been used for the first time and the cap body is fitted, the discharge opening, which is covered by the cap, is able to dry off as a result of the connection to the surrounding atmosphere.

The ventilation opening is provided with a filter membrane for filtering the air which flows through it. The cap body comprises two part-bodies which together form a receiving space for the filter membrane.

In the case of said second variant of the invention, its unique feature is that the cap body is assembled from two part-bodies, between which the named filter membrane is arranged. In principle, it can additionally be provided that the ventilation opening, in which the filter membrane is provided, is additionally closed prior to the first operation, for example by means of a pull-off portion of the type described above. Where a filter membrane is present, it is also possible, however, to dispense with such a closure as the ingress of contaminants is effectively prevented by means of the filter membrane. Said filter membrane preferably comprises an average pore diameter of between 0.1 μm and 0.3 μm for this purpose. From a manufacturing point of view, the two part-bodies create an advantageous option for providing a comparatively large-surface membrane on the cap body in an automated production process.

It is particularly advantageous when the first part-body forms a cap main body with a lateral surface and an end face with a first breakthrough. The second part-body can then be realized as a ring body which is fastenable on the first part-body in a circumferential manner and comprises a second breakthrough which is in alignment with the first breakthrough.

In this connection, a first option of the design provides that the two part-bodies are manufactured separately and are connected together by means of a non-positive locking or in particular positive locking coupling, the membrane being placed between them and preferably clamped in that position.

An alternative design provides that the part-bodies are connected together by way of a substance-to-substance bond. In this connection, one variant, in particular, is deemed to be advantageous where, within the framework of the manufacturing process, the first part-body, which forms the cap main body, is produced first of all by means of injection moulding, the membrane is then placed into the mould and then the second part-body is injection moulded onto the first part-body. During said injection moulding process, part of the membrane surface has to be kept free of plastics material. Where the membrane is covered by plastics material as intended during the injection moulding process, an inside join between the second part-body and the membrane is formed, as a result of which a path which surrounds the membrane, through which bacteria or other contaminants could ingress, is effectively prevented from remaining open.

The first breakthrough can have an inside structure which divides the breakthrough into several part breakthroughs and on which the filter membrane rests.

The inside structure can be, for example, grid-shaped or spoke-like. In particular, in the case of the design described where the membrane is inserted once the first part-body has been injected, it is advantageous when the named inside structure is present so that the filter membrane retains its position during the injection moulding and, in particular, so that it is possible to prevent the filter membrane being completely covered by a mould-side displacement body which, for this purpose, is pressed against the membrane which, in turn, is supported on said inside structure. In addition, said inside structure is also advantageous during the use of the product as it prevents the filter membrane from being pressed inadvertently into the cap as a result of the application of force.

For forming the receiving space, the two part-bodies comprise surfaces which point to one another, between which is arranged the filter membrane which, in this case, is supported on both sides by the surfaces.

The surfaces which point to one another on the two part-bodies preferably form, in particular, a circumferential chamber which is open on one side and in which the edge region of the membrane is inserted. As already mentioned, during the injection moulding of the second part-body, the surface which is provided on its side can form an inside connection to the membrane, which results in particularly good sealing.

Resiliently deflectable portions, which are resiliently deflected as a result of being assembled with the filter membrane or with the other part-body and bring about a holding force in the direction of the filter membrane, can be provided on one of the part-bodies.

The named resiliently deflectable portions can be deflected and consequently tensioned by means of the inserted filter membrane during the production of the cap such that, once the second part-body has been added, they push the membrane against said second part-body and consequently secure the position of the filter membrane in an additional manner.

The caps according to the two described variants are preferably produced from plastics material, for example from polypropylene or polyethylene.

The design of the dispenser is basically flexible. It can be a dispenser with a pump or a switchable outlet valve, by means of which previously pressurized liquid is able to be discharged in a targeted manner. Especially advantageous, however, is a design with a squeeze bottle as a liquid reservoir. In the case of such a design, it is preferably additionally provided that an outlet valve which opens in dependence on pressure is provided in the discharge head, said outlet valve only opening when the pressurization of the liquid, in particular in the squeeze bottle, is sufficient and consequently allowing liquid to be discharged.

The cap according to the invention can additionally be used with dispensers with different discharge characteristics, thus, for example, in the case of spray dispensers. Provided in particular, however, is use in the case of dropper dispensers, as such dropper dispensers have a drop-forming surface surrounding the discharge opening, on which drop-forming surface the discharged liquid collects in an intended manner before the drop is released. Precisely in the case such dispensers, it is advantageous to enable drying off after use as a result of a cap with a ventilation opening.

A dispenser according to the invention can be realized, in particular, as a dropper dispenser for delivering eye drops.

The term liquid dispenser within the meaning of said invention includes both dispensers for low-viscosity liquids similar to water and dispensers for high-viscosity, more paste-like liquids.

BRIEF DESCRIPTION OF THE DRAWINGS

Further advantages and aspects of the invention are produced from the claims and from the following description of preferred exemplary embodiments of the invention which are explained below by way of the Figures.

FIGS. 5A to 5C and 6A and 6B illustrate the design of the cap of the dispenser of FIG. 4.

DETAILED DESCRIPTION OF THE EXEMPLARY EMBODIMENTS

FIGS. 1A to 3B show a first exemplary embodiment of a liquid dispenser according to the invention.

Figure 1A:
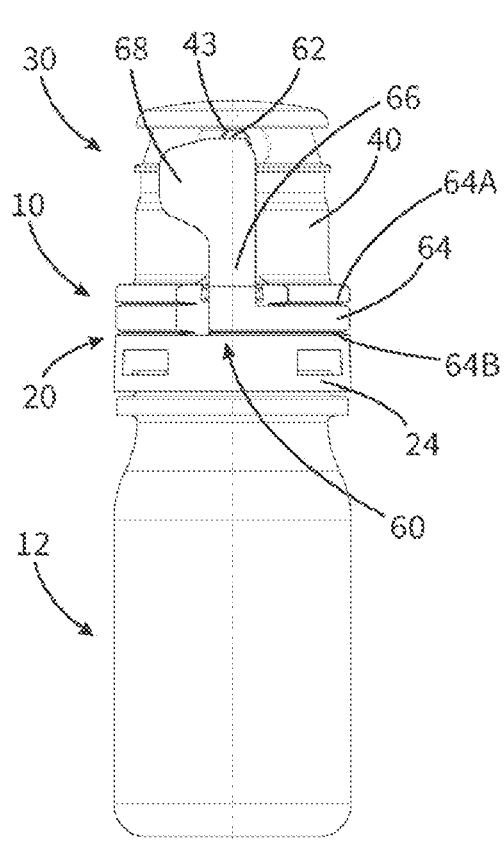
FIGS. 1A and 1B show a first exemplary embodiment of a dispenser according to the invention in the delivery state.
Figure 1B:
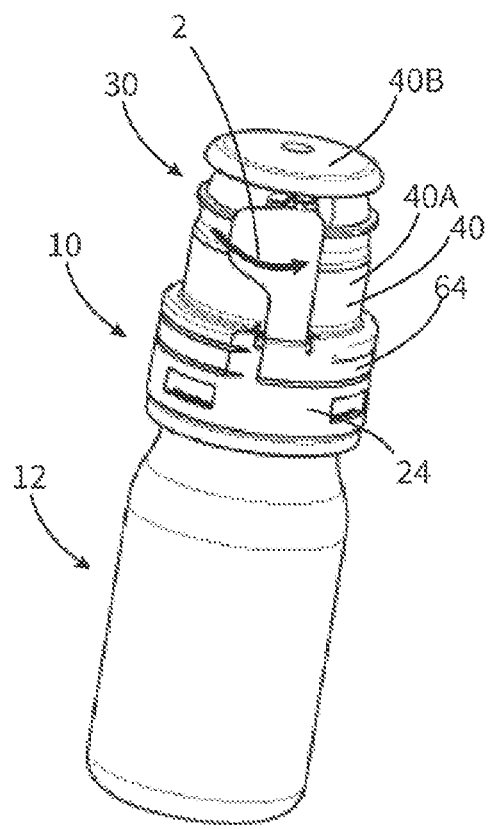

In this case, FIGS. 1A and 1B show the liquid dispenser 10 in the delivery state. The liquid dispenser 10 has a liquid reservoir 12, which is realized as a squeeze bottle, and a discharge head 20 which is fitted thereon with a discharge opening 22 which is not shown in FIGS. 1A and 1B and is protected by a cap body 40. Said cap body 40 is part of a cap 30 which, in the delivery state, additionally includes a detachable segment 60 which is to be detached from the cap body 40 for the purposes of the initial operation of the liquid dispenser 10. Said detachable segment 60 includes a circumferential tamper-evident portion 64 in the form of a ring which is connected in connecting regions 64A, 64B on one side to the cap body 40 and on the other side to a ring-shaped holding portion 24 which is fastened on the discharge head 20. Said tamper-evident portion 64 prevents removal of the cap body 40 from the discharge head 20 initially in the delivery state.

Over and above this, the detachable segment 60 has a pull-off portion 62, which closes a ventilation opening 42 and, to this end, is connected integrally to the lateral surface of the cap body 40 along a circumferential separating line 43. The plastics material of the cap 30 is designed in a very thin manner in the region of said separating line such that a tear line is produced here.

The pull-off portion 62 and the tamper-evident portion 64 are connected together by means of a connecting portion 66, in the region of which the detachable segment 60 is not connected to the lateral surface 40A of the cap body 40. The connecting portion 66 is designed in a comparatively thick-walled manner just as a grip portion 68 such that when the detachable segment 60 is handled in the correct manner no substantial deformation occurs.

For the first operation of the dispenser the detachable segment 60 is gripped in the region of the grip portion 68 and tilted in the direction of the arrow 2.

Figure 2A:
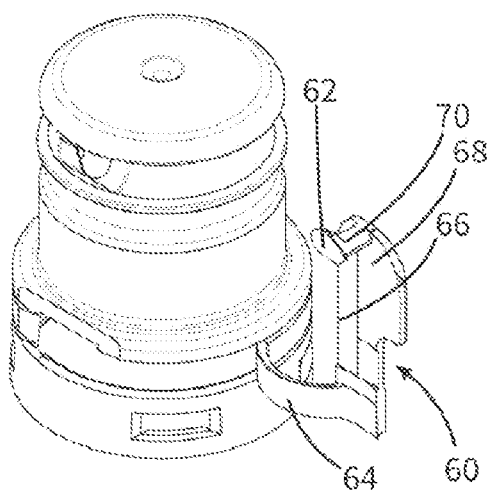
FIGS. 2A and 2B show the cap of the dispenser according to FIGS. 1A and 1B in the course of transferring the dispenser into the useful state.
Figure 2B:
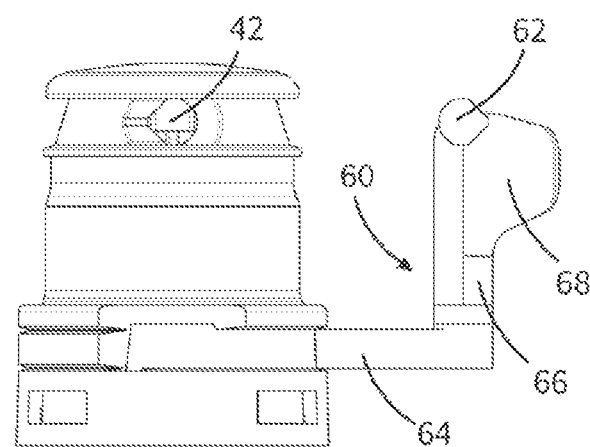
Figure 3A:
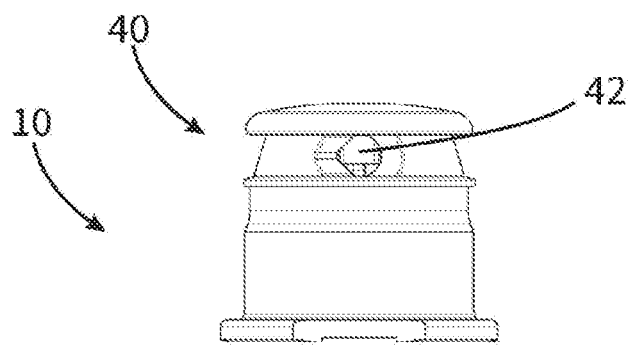
FIGS. 3A and 3B show the dispenser of FIGS. 1A and 1B in the useful state.
Figure 3B:
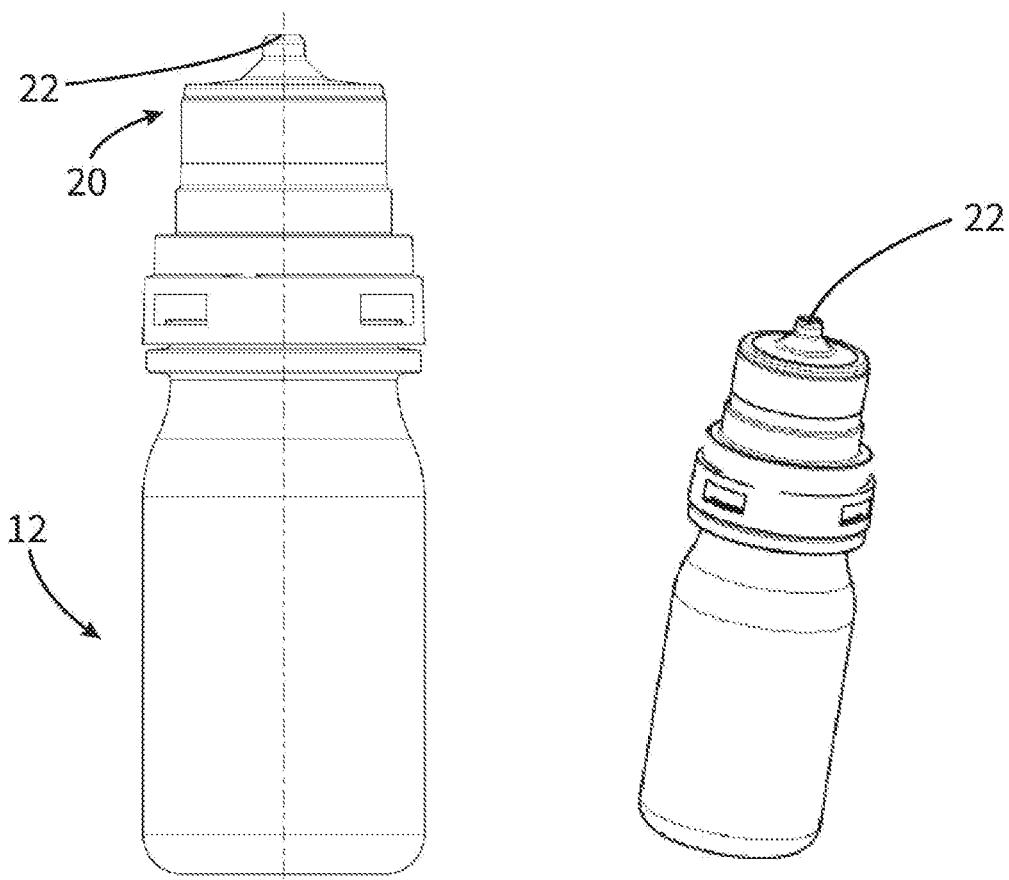

With reference to FIGS. 2A and 2B, the effect this has first of all is that the pull-off portion 62 releases the ventilation opening 42. This is promoted by a rigidly realized spacer portion 70 which brings about a comparative high lever force, by means of which the connection between the pull-off portion and the lateral surface is detached in the tapered left-hand region of the ventilation opening with reference to FIG. 2B. It is then possible to remove the pull-off portion 62 completely from the ventilation opening using a small amount of force. As the detachable segment 60 continues to move, the tamper-evident portion 64 is detached from the holding portion 24 and from the cap body 40 such that the cap body 40 is then removed and is able to be refitted once the dispenser has been used. The discharge head 20 and the cap body 40 are matched to one another in such a manner that the cap holds in a non-positive locking manner on the discharge head.

Figure 4:
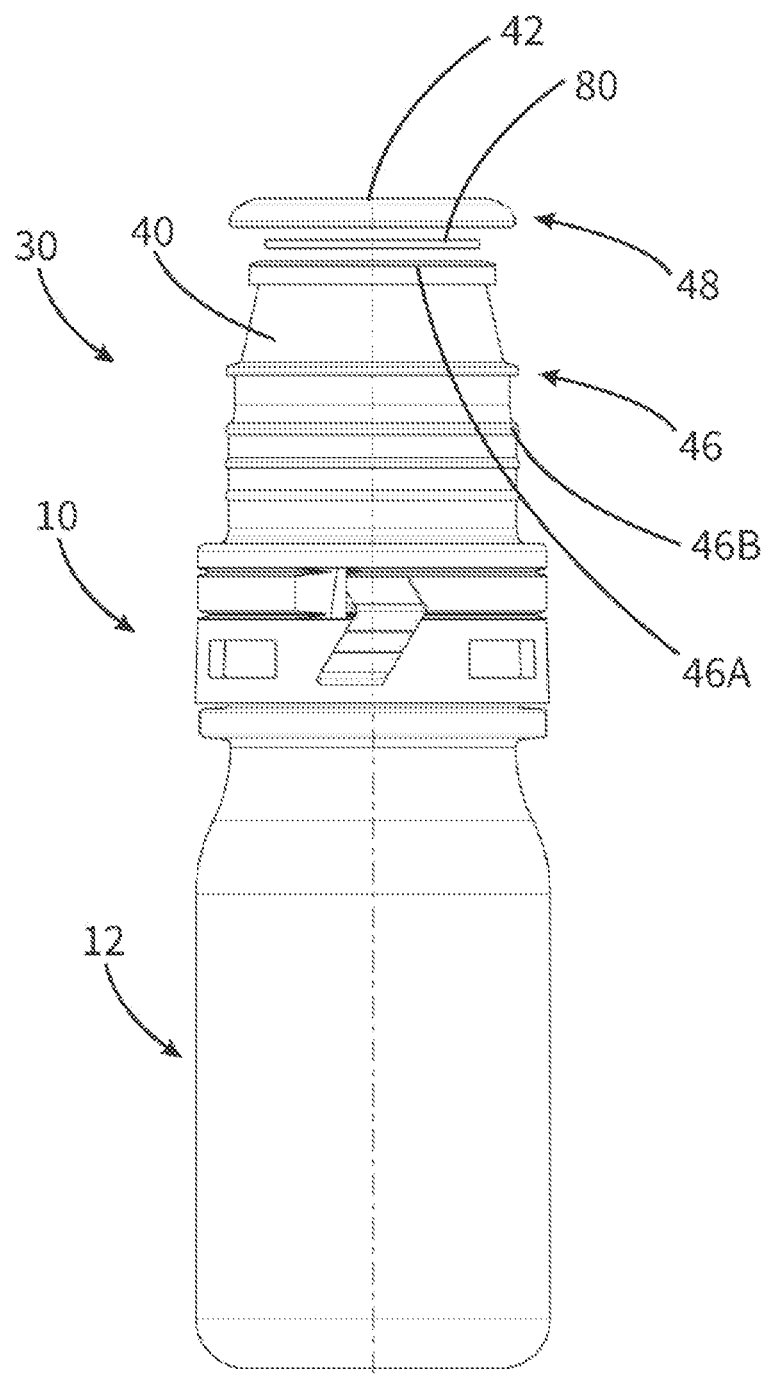
FIG. 4 shows a second exemplary embodiment of a dispenser according to the invention.

FIG. 4 shows a second exemplary embodiment of the invention, said second exemplary embodiment differs from the first exemplary embodiment only in the design of the cap 30. The liquid dispenser 12 and the discharge head 20, in contrast, are identical to the previously described exemplary embodiment.

As already indicated in FIG. 4, the cap 30 here consists of two part-bodies 46, 48, between which a filter membrane 80 is arranged.

FIGS. 6A and 6B show the design in section. The part-body 46 forms the cap main body with a lateral surface 46A and an end face 46B, over which an inside structure 46D extends, in which breakthroughs 46C are provided for the purposes of ventilation. The filter membrane 80 is positioned, and in a preferred manner the second part-body 48, which is designed in a ring-shaped manner and has a breakthrough 48C, is fitted on said end face and the inside structure 46D. The filter membrane 80 is effectively fixed in position, in this case, as a result of resiliently deflectable claw-like elements 46F. In addition, its edge is clamped in the manner shown in FIG. 6B in a circumferential receiving space 82 which is formed by the two part-bodies 46, 48. The different stages during the production of the cap 30 are illustrated by way of FIGS. 5A to 5C.

The ring-shaped part-body 48 can be formed in a non-positive locking manner by means of a press fit on the inside surface of the part-body 48 and the outside surface of the part-body 46. It is also possible to provide a snap-type connection here.

A particularly advantageous design provides that during the injection moulding process the part-body 46 is created first of all and, once it has set, the filter membrane 80 is placed on the end face. The second part-body 48 can then be created as a result of injection moulding onto the first part-body. As a result, on the one hand, a particularly solid connection is created between the part-bodies as a result of a substance-to-substance bond. On the other hand, the downwardly turned face 48E on the second part-body 48 also establishes a particularly strong connection here to the end regions of the filter membrane 80 such that bacteria passing through is not something to be feared. On the underside of the filter membrane 80, which rests on the end face 46B and there on the surface 46E, there is no such strong connection.

It would certainly also be conceivable, in principle, to inject the two part-bodies 46 and 48 together instead of the above. However, this would be accompanied by a very complicated mould in order to be able to hold the filter membrane 80 in position in the meantime and inject around it. Consequently, the method according to the invention with placing the membrane on the first part-body 46 is advantageous.

The invention claimed is:

1. A liquid dispenser for discharging pharmaceutical liquids comprising:
   a discharge head having discharge opening; and
   a cap with a cap body, the cap being fittable on and removable from the discharge head and which, in a fitted state, covers the discharge opening;
   the cap body having a ventilation opening which connects a surrounding atmosphere to an interior of the cap body such that once the liquid dispenser has been used for a first time and the cap body is fitted, the discharge opening, which is covered by the cap body, is able to dry off as a result of a connection to the surrounding atmosphere;
   the ventilation opening being provided with a filter membrane for filtering the air which flows therethrough; and
   the cap body comprising two part-bodies which together form a receiving space for the filter membrane;
   wherein a first part-body of the two part-bodies is a cap main body with a lateral surface and an end face with a first breakthrough; and
   wherein a second part-body of the two part-bodies is a ring body which is fastenable on the first part-body in a circumferential manner and comprises a second breakthrough which is in alignment with the first breakthrough.

2. The liquid dispenser according to claim 1, wherein:
   the first breakthrough has an internal structure which divides the breakthrough into several part breakthroughs and on which the filter membrane rests.

3. The liquid dispenser according to claim 1, wherein:
   the two part-bodies are connected together in a positive locking and/or non-positive locking manner.

4. The liquid dispenser according to claim 1, wherein:
   the two part-bodies are connected together by way of a substance-to-substance bond.

5. The liquid dispenser according to claim 1, wherein:
   resiliently deflectable portions, which are resiliently deflected as a result of being assembled with the filter membrane or with the first part-body and bring about a holding force in a direction of the filter membrane, are provided on the second part-body.

6. The liquid dispenser according to claim 1, wherein:
   the filter membrane comprises a microfiltration membrane and has an average pore diameter of between 0.1 µm to approximately 0.3 µm.

7. The liquid dispenser according to claim 1, wherein:
   a circumferential edge region of the filter membrane is arranged between the part-bodies of the cap body.

8. The liquid dispenser according to claim 1, wherein:
   the cap is produced from plastics material.

9. The liquid dispenser according to claim 1, wherein:
   the liquid dispenser has a liquid reservoir comprising a squeeze bottle.

10. The liquid dispenser according to claim 1, wherein:
    the discharge head includes an outlet valve which opens in dependence on pressure.

11. The liquid dispenser according to claim 1, wherein:
    the discharge head delivers individual drops.

12. A liquid dispenser for discharging pharmaceutical liquids comprising:
    a discharge head having discharge opening; and
    a cap with a cap body, the cap being fittable on and removable from the discharge head and which, in a fitted state, covers the discharge opening;
    the cap body having a ventilation opening which connects a surrounding atmosphere to an interior of the cap body such that once the liquid dispenser has been used for a first time and the cap body is fitted, the discharge opening, which is covered by the cap body, is able to dry off as a result of a connection to the surrounding atmosphere;
    the ventilation opening being provided with a filter membrane for filtering the air which flows therethrough; and
    the cap body comprising two part-bodies which together form a receiving space for the filter membrane;
    wherein the two part-bodies comprise surfaces which point to one another, between which is arranged the filter membrane which is supported on both sides by the surfaces.

* * * * *